No. 611,413. Patented Sept. 27, 1898.
G. KOCHERHANS.
APPARATUS FOR INDICATING NUMBER OF WEFT SHOTS IN WOVEN FABRICS.
(Application filed July 19, 1898.)
(No Model.) 2 Sheets—Sheet 1.
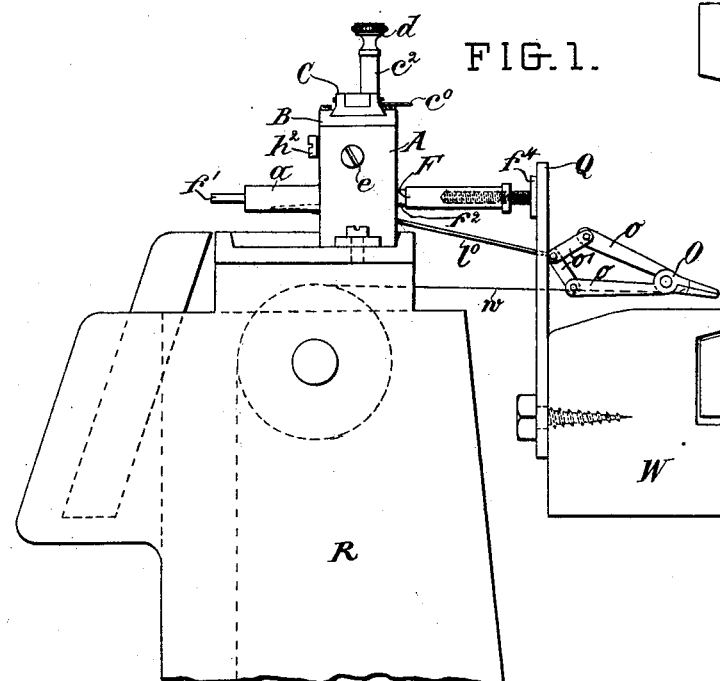
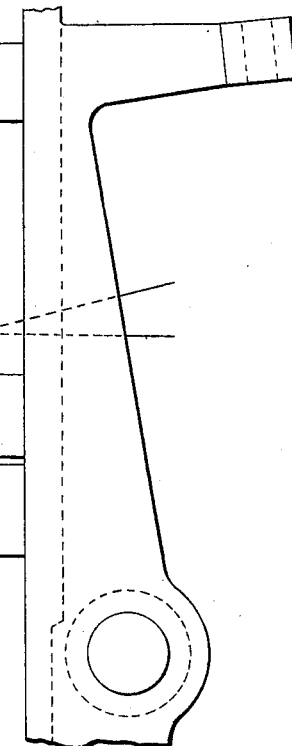
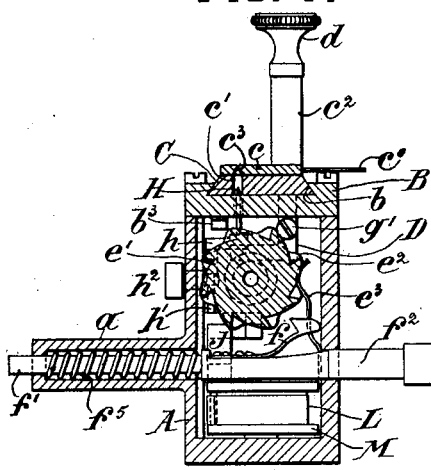
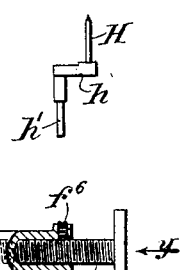
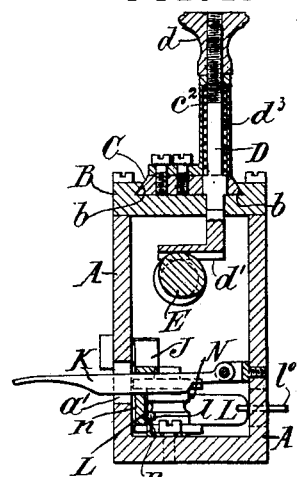
Witnesses:
Inventor:
Georg Kocherhans
by Henry Connett
Attorney No. 611,413. Patented Sept. 27, 1898.
G. KOCHERHANS.
APPARATUS FOR INDICATING NUMBER OF WEFT SHOTS IN WOVEN FABRICS.
(Application filed July 19, 1898.)
(No Model.) 2 Sheets—Sheet 2.
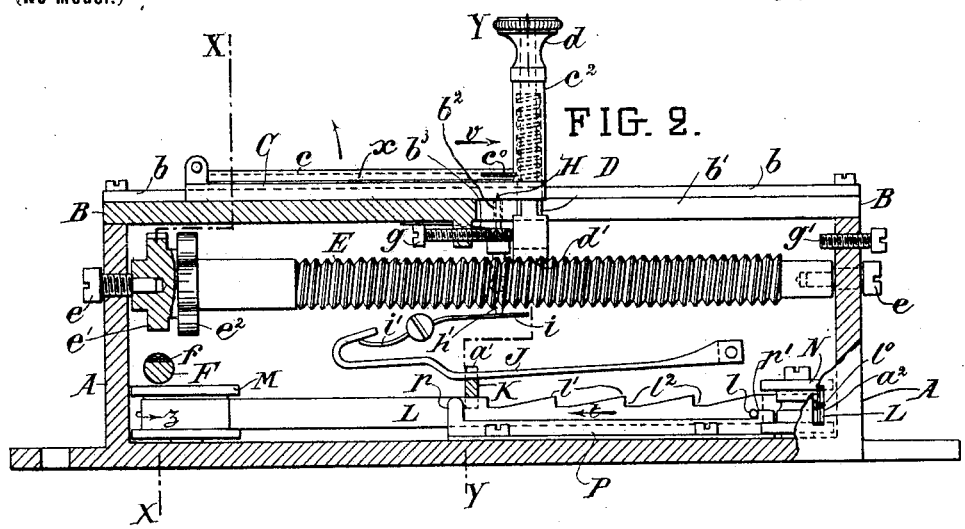
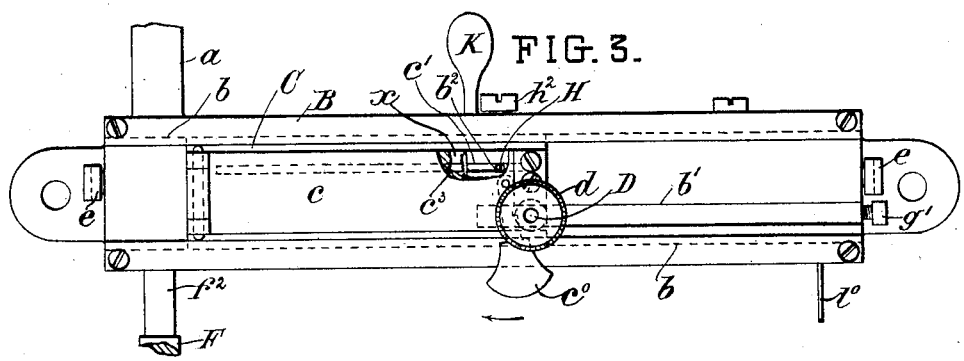
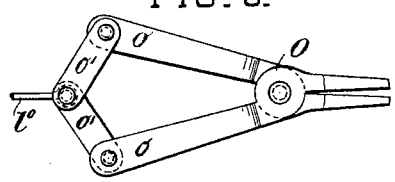
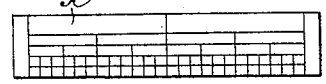
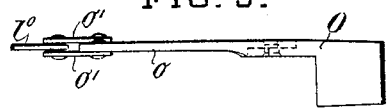
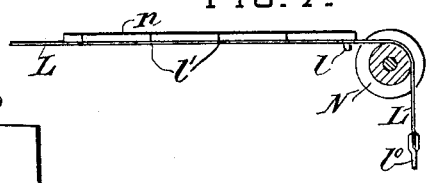
Witnesses:
F. W. Winman
Peter A. Ross
Inventor:
Georg Kocherhans
by Henry Connett
Attorney
THE NORRIS PETERS CO., PHOTO-LITHO., WASHINGTON, D. C.

UNITED STATES PATENT OFFICE.

GEORG KOCHERHANS, OF RÖTTELN, GERMANY.

APPARATUS FOR INDICATING NUMBER OF WEFT-SHOTS IN WOVEN FABRICS.

SPECIFICATION forming part of Letters Patent No. 611,413, dated September 27, 1898.

Application filed July 19, 1898. Serial No. 686,325. (No model.)

*To all whom it may concern:*

Be it known that I, GEORG KOCHERHANS, a citizen of the Republic of Switzerland, residing at Rötteln, near Loerrach, in the Grand Duchy of Baden, German Empire, have invented an Apparatus for Indicating the Number of Weft-Shots in Woven Fabrics, of which the following is a specification.

This invention relates to an apparatus or instrument adapted for use in connection with a loom and to be operated by the lathe or going part of the loom for determining the number of shots of weft in a given length of the fabric that is being woven; and the object is to provide an instrument which may be mounted on the loom-frame and in which the operator may at any time or at suitable intervals insert a card having marked on it graduations and then set the apparatus in motion.
The card is moved along step by step a predetermined distance at each stroke of the lathe, and when a certain length of fabric is woven a marker controlled by the moving fabric pricks or marks the card, thus indicating on the graduations on the card the number of weft-shots in an inch or other length of the fabric.

The apparatus stops automatically when the indicator-card shall have passed over the marker and the card may then be taken out and the record thereon inspected.

In the drawings, which illustrate an embodiment of the invention, Figure 1 is a side elevation of the front portion of a loom, showing the lay or going part and my apparatus in end elevation mounted on the loom-frame at the breast-beam. Fig. 2 is a sectional front elevation of the apparatus detached on a larger scale than Fig. 1. Fig. 3 is a plan of the apparatus as seen in Fig. 2. Fig. 4 is a vertical transverse section at line X X in Fig. 2. Fig. 5 is a vertical transverse section at line Y Y in Fig. 2. Fig. 6 shows the marking-pin H, detached. Fig. 7 is a fragmentary detail view showing the metal ribbon or tape L in plan. Fig. 8 is a side elevation, and Fig. 9 a plan, of the nippers O detached. Fig. 10 shows the graduated indicator-card $x$ detached.
In Fig. 1, R represents part of the frame of a loom, and W the lathe or going part of the same. The fabric which is being woven is designated by $w$. On the loom-frame is mounted my improved apparatus in position to be actuated by some part Q of the lathe W.

The details of construction of the apparatus will be best understood from the figures, wherein it is drawn to a larger scale.

A is the frame to support the mechanism, preferably in the form of a box, on which is secured a removable cover B. This cover has formed in it, Figs. 4 and 5, a dovetail groove or way $b$, in which is mounted a sliding carriage C. On this carriage is a hinged flap or plate $c$, between which and the carriage may be clamped the indicator-card $x$. The carriage C is moved along in its groove or way by the means now to be described.

Extending longitudinally through the box A and journaled at its ends on screws $e\ e$ in the box is a screw E, and mounted in an upright tubular socket $c^2$, fixed on the carriage C, is a rod D, having screwed on its upper end a thumb-nut $d$ and being provided at its lower end, inside of the box A, with a foot $d'$, having teeth or ribs which engage the threads on the screw E. A coil-spring $d^3$ in the socket $c^2$ and bearing downward upon a shoulder on the rod D keeps the foot $d'$ pressed down into engagement with the screw E. The foot $d'$ may, however, be lifted out of engagement with the thread of the screw by screwing down the nut $d$. When the carriage C moves along in its groove or way in the direction of the arrow $v$ in Fig. 2, the rod D plays in a slot $b'$ in the box-cover B.

The screw E is rotated by intermittent impulses imparted by the lathe W, and the construction of the ratchet mechanism between the lathe and the screw E is best seen in Fig. 4.

On the screw E is fixed a ratchet-wheel $e'$, and below said wheel and extending transversely through the box M is a pawl-rod F, carrying a spring-pawl $f$, adapted to engage a tooth of the wheel $e'$ and rotate the latter to the extent of one tooth when the pawl-rod is pushed in or in the direction indicated by the arrow $y$ in Fig. 4. To keep it from rotating, the rod F may be squared at $f^2$, where it passes through the box, and to retract it a spring $f^5$ embraces its reduced extremity $f'$ in a housing $a$ on the side of the box A. This spring is embraced between the end of the housing $a$ and a shoulder on the rod F. To vary the length of the rod F, the enlarged end $f^3$ thereof is made tubular and screw-threaded to receive an abutment-screw $f^4$ for the lathe-finger Q, Fig. 1, to impinge upon. The screw $f^4$ may be secured, when once adjusted, by a set-screw $f^6$.

It will be seen from the above description that each blow of the lathe-finger Q on the rod F imparts a partial rotation to the screw E and that this rotation moves the carriage C to a corresponding extent, determined by the pitch of the screw and the number of teeth in the ratchet-wheel $e'$, say one ninety-sixth of an inch. Back rotation of the screw E is prevented by a wheel $e^2$, fixed thereon, and a spring-detent $e^3$, engaging rounded recesses in said wheel. Screws $g$ and $g'$, Fig. 2, in the box A limit the movement of the carriage C.

The means employed for pricking or marking the indicator-card $x$ at regular intervals, say at every half-inch of the fabric $w$ that is woven, will now be described.

H is a marking-pin, Fig. 6, fixed upright in a block $h$, which has a pendent stem $h'$, that passes down loosely through a transverse hole in a supporting-screw $h^2$, driven in through the side of the box A, and under the pendent stem $h'$ is situated one arm $i$ of a lever $i\ i'$, Fig. 2, fulcrumed on the side of the box. A spring J, fixed to the side of the box, has a hook at its free end, which takes over the other arm $i'$ of the said lever. This spring J is upheld normally by a lever K, Fig. 5, which extends transversely through the box A and is fulcrumed on the side of the same, and this lever K rests on a metallic tape L, which comes from a spring-barrel M in the box. This barrel is in substance the same as that of the ordinary spring tape-measure and need not be further described, except to say that the spring therein tends always to wind up the tape L by moving it in the direction of the arrow $t$ seen thereon in Fig. 2. The tape L passes about a guide-sheave N in the box A and out at a slot $a^3$ in the side of the box. In the box at the side of the tape L is a plate P, with upright stops $p$ and $p'$ to limit the extent of movement of the tape, the latter having in it a detent-stud $l$ to engage said stops. The tape has in it teeth somewhat like ratchet-teeth, forming perpendicular shoulders $l'$ and recesses $l^2$, and these shoulders are accurately spaced, say half an inch apart.

Coupled to the end of the tape at $l^0$ is a nipper O, (seen detached in Figs. 8 and 9,) consisting of two pivotally-connected jaws $o$ and two links $o'$, which couple the jaws to the tape L.

The pin H projects up through a hole in the box-cover B and into a slot $c'$, Fig. 4, in the carriage C. In the flap $c$ is a groove $c^3$, which when the flap is closed down registers with the slot $c'$. The flap $c$ is held down by a latch $c^0$, which engages a latch-recess in the upright socket $c^2$.

The operation of the apparatus is as follows: The operator sets the carriage C to the position seen in Fig. 2, places an indicator-card $x$ under the flap $c$, and secures it in place with the flap, then raises the lever K, which projects through a hole $a'$ in the box, and draws out the tape L as far as the stud $l$ will permit. He then secures the nipper O to the fabric $w$ at the farthest point it will reach. The repeated blows of the lathe-finger Q on the pawl-rod F rotates the screw F slowly and moves the carriage along in the direction of the arrow $v$ in Fig. 2, the carriage bearing with it the card $x$. In the meantime each weft-shot adds to the fabric $w$ woven, and as this fabric moves on (to the left in Fig. 1) toward the apparatus the spring-barrel M is permitted to take up the tape L and the notched portion thereof is drawn under the lever K. When a shoulder $l'$ is brought under the lever K and passes, the lever falls under the pressure of the spring J, and the hooked extremity of the latter, catching the arm $i'$ of the lever $i\ i'$, draws said arm down sharply, causing the other arm to strike upwardly against the stem $h'$ of the pin H and drive the latter upward like a projectile, causing its point to puncture or mark the indicator-card $x$. A light spring $b^3$ between the block $h$ of the pin and the box-cover B serves to drive the pin back and prevent it sticking in the card. At each time the lever K drops off from a shoulder $l'$ on the metal tape there will be a puncture made in the card $x$. The lever rides up the incline on the tape to the next shoulder. When the foot $d'$ passes off the screw-threaded portion of the screw E, as it will do when it reaches the stop-screw $g'$, the movement of the carriage will cease, and when the stud $l$ in the tape L is arrested by the stop $p$, so that the spring-barrel M can take up no more of it, the strain on the nipper O will be removed and the latter will automatically release its hold on the fabric. Thus the operation of the apparatus is arrested automatically. Indicator-cards may be taken as often as desired for the purpose of determining the number of weft-picks to the inch being employed.

As the tape L is rather thin and the notched portion will be or may be always straight, it is preferred to reinforce it with a plate $n$, as seen in Fig. 7. Indeed it will be obvious that this notched plate might be employed alone for the operative part of the tape, the latter being cut out at this point and secured to the plate $n$ at its ends; but it is convenient to use a continuous tape. The plate P may be made longitudinally adjustable by slotting the apertures through which its securing-screws pass.

It will be understood that I do not limit myself to the particular details of construction herein set forth, as these may be varied within the knowledge of any good workman without departing materially from my invention.

Having thus described my invention, I claim—

1. The combination with a loom, of an apparatus for the purpose described connected therewith, said apparatus comprising a carriage to hold an indicator-card, means between the lathe of the loom and said carriage whereby the latter is propelled intermittently by the former, a marker for marking the card at intervals corresponding to the length of the fabric being woven on the loom, and means for operating said marker, controlled by the fabric being woven, substantially as set forth.

2. An apparatus for the purpose set forth, comprising a frame to support the mechanism, a carriage C mounted movably on said frame and adapted to receive and carry an indicator-card, means for securing said card in place, a rotatable screw E in the frame geared to said carriage for moving the latter, a ratchet-wheel $e'$ on said screw E, a spring-retracted pawl-rod F, mounted in sliding bearings in the frame and carrying a pawl $f$, adapted to engage the teeth of said ratchet-wheel, the said pawl, a reciprocating marker for marking the indicator-card, and means for operating said marker adapted to be controlled by the fabric which is being woven on the loom, substantially as set forth.

3. An apparatus for the purpose set forth, comprising a frame to support the mechanism, a carriage mounted movably on said frame and adapted to receive and carry an indicator-card, means for moving said carriage a predetermined distance at each weft-shot of the loom, and mechanism, controlled by the fabric being woven on the loom, for marking said indicator-card at predetermined intervals, said mechanism consisting of a marker adapted to be driven into contact with the indicator-card, a lever $i\ i'$ for driving said marker; a spring J, adapted when permitted to act, to actuate said lever $i\ i'$, a lever K which holds the spring J inactive, a self-winding tape L under and supporting said lever K, said tape having shoulders $l'$ and recesses $l^2$, at predetermined intervals, whereby the marker is operated, and a nipper attached to the end of said tape for securing the latter to the fabric being woven in the loom, substantially as set forth.

4. In an apparatus for the purpose specified, the combination with the frame which supports the mechanism, the screw E, mounted rotatively therein and a pawl-and-ratchet mechanism for rotating said screw by intermittent impulses, of the sliding carriage C, mounted in guides on the frame, the hinged flap $c$, on said carriage and adapted to hold in place an indicator-card thereon, the upright socket $c^2$, on said carriage, the rod D mounted in said upright socket and provided with a foot $d'$ having teeth which gear with the threads of the screw E, the spring $d^3$, which presses the rod D down elastically, and the nut $d$, on the upper end of the rod D, for raising the same, substantially as set forth.

5. In an apparatus for the purpose specified, the combination with the frame which supports the mechanism, the slotted, sliding carriage C, mounted on the frame, and mechanism for moving the carriage a predetermined distance at each weft-shot, of the pin H, having a pendent shank $h'$, and mounted in a bearing in the frame beneath the carriage C, the pin-operating lever $i\ i'$, having one arm $i$ situated under the pin, the spring J, a hook on which takes over the other arm $i'$ of the pin-operating lever, the transverse lever K, on which the spring J bears, the spring-barrel M, for winding up the metal tape L, the said tape, having in its upper edge ratchet-like teeth as described, means for limiting the extent of movement of said tape, and means for securing the said tape to the fabric which is being woven in the loom, substantially as set forth.

In witness whereof I have hereunto signed my name, this 17th day of June, 1898, in the presence of two subscribing witnesses.

GEORG KOCHERHANS.

Witnesses:
GEORGE GIFFORD,
AMAND RITTER.